US012603347B2

(12) United States Patent
Rhee et al.

(10) Patent No.: US 12,603,347 B2
(45) Date of Patent: Apr. 14, 2026

(54) METHOD FOR DESIGNING BATTERY MODULE

(71) Applicant: SK On Co., Ltd., Seoul (KR)

(72) Inventors: Seo Roh Rhee, Daejeon (KR); Hae Ryong Jeon, Daejeon (KR); Yang Kyu Choi, Daejeon (KR)

(73) Assignee: SK On Co., Ltd., Seoul (KR)

( * ) Notice: Subject to any disclaimer, the term of this patent is extended or adjusted under 35 U.S.C. 154(b) by 881 days.

(21) Appl. No.: 17/825,828

(22) Filed: May 26, 2022

(65) Prior Publication Data

US 2022/0384874 A1     Dec. 1, 2022

(30) Foreign Application Priority Data

May 27, 2021     (KR) ........................ 10-2021-0068254

(51) Int. Cl.
| | |
|---|---|
| *H01M 10/653* | (2014.01) |
| *H01M 10/625* | (2014.01) |
| *H01M 10/647* | (2014.01) |
| *H01M 50/211* | (2021.01) |
| *H01M 50/249* | (2021.01) |

(52) U.S. Cl.
CPC ....... *H01M 10/653* (2015.04); *H01M 10/625* (2015.04); *H01M 10/647* (2015.04); *H01M 50/211* (2021.01); *H01M 50/249* (2021.01); *H01M 2220/20* (2013.01)

(58) Field of Classification Search
None
See application file for complete search history.

(56) References Cited

U.S. PATENT DOCUMENTS

| | | | |
|---|---|---|---|
| 10,928,461 B1* | 2/2021 | Stafl | G01R 31/371 |
| 2017/0150630 A1* | 5/2017 | Lyon | H01M 10/425 |
| 2020/0127323 A1 | 4/2020 | Juzkow et al. | |

FOREIGN PATENT DOCUMENTS

| | | | |
|---|---|---|---|
| CN | 109449347 A | | 3/2019 |
| DE | 102019209448 A1 | | 12/2020 |
| KR | 20170095040 | * | 8/2017 |
| KR | 20170095040 A | | 8/2017 |

OTHER PUBLICATIONS

Machine Translation of KR20170095040 (Year: 2017).*
"Aluminium nitride—Wikipedia", Apr. 30, 2024, XP093157462, Retrieved from the Internet: URL: https://en.wikipedia.org/wiki/Aluminium_nitride.
Extended European Search Report for the European Patent Application No. 22175681.0 issued by the European Patent Office on May 15, 2024.

* cited by examiner

*Primary Examiner* — Wyatt P McConnell
(74) *Attorney, Agent, or Firm* — IP & T GROUP LLP

(57)          ABSTRACT

Provided is a method for designing a battery module including a cell assembly in which a plurality of battery cells are stacked and a module case having an internal space in which the cell assembly is accommodated, the method including: a) setting a lowermost portion of the module case with respect to a direction of gravity as a design side, and setting a region between the design side and the cell assembly as a design space; and b) obtaining a relative permittivity $\varepsilon_r$ of the design space satisfying Equation 1 $\varepsilon_r\varepsilon_0 A_0/T_1 \leq PCy$ by assuming that a shape of the design space is a form of a film having an area of $A_0$ and a thickness of $T_0$.

8 Claims, 5 Drawing Sheets

[FIG. 1]
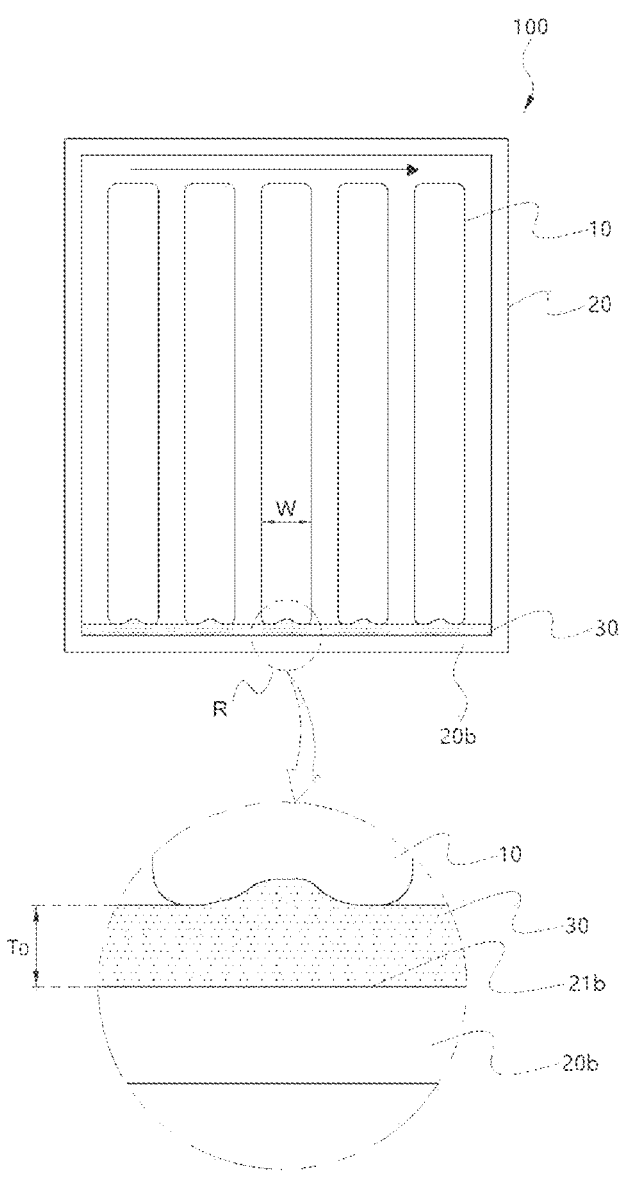

【FIG. 2】
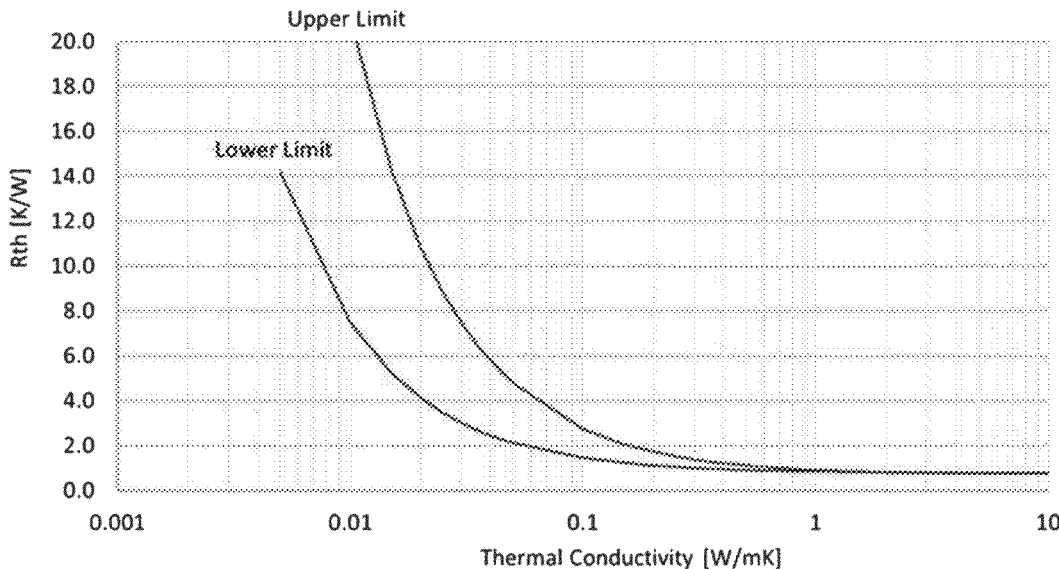

[FIG. 3]
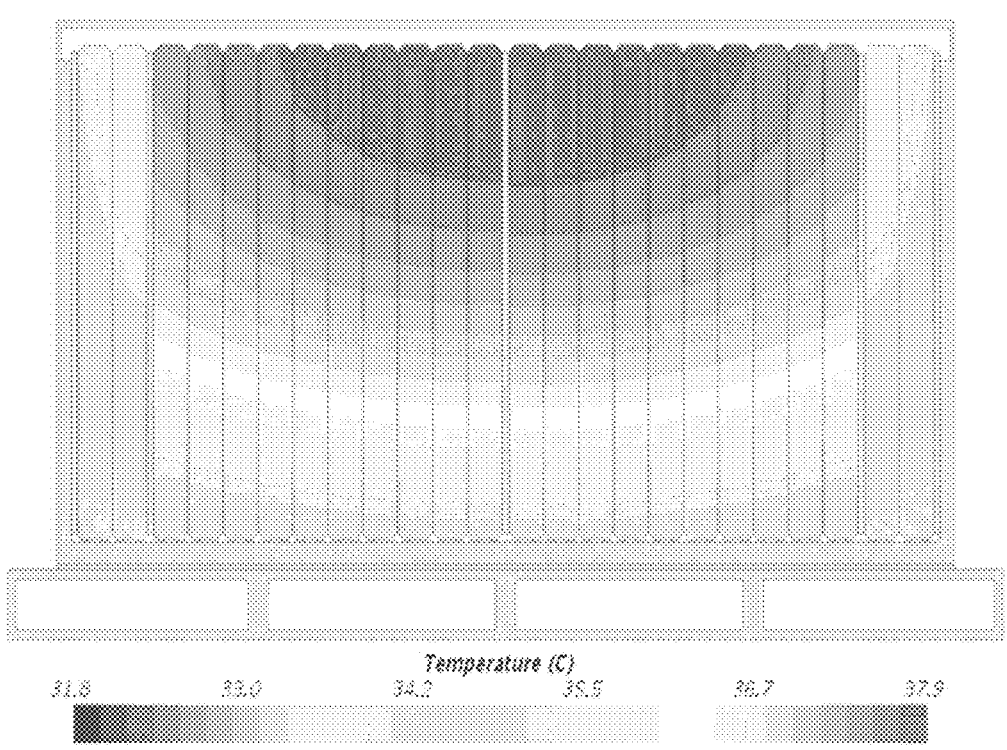

[FIG. 4]
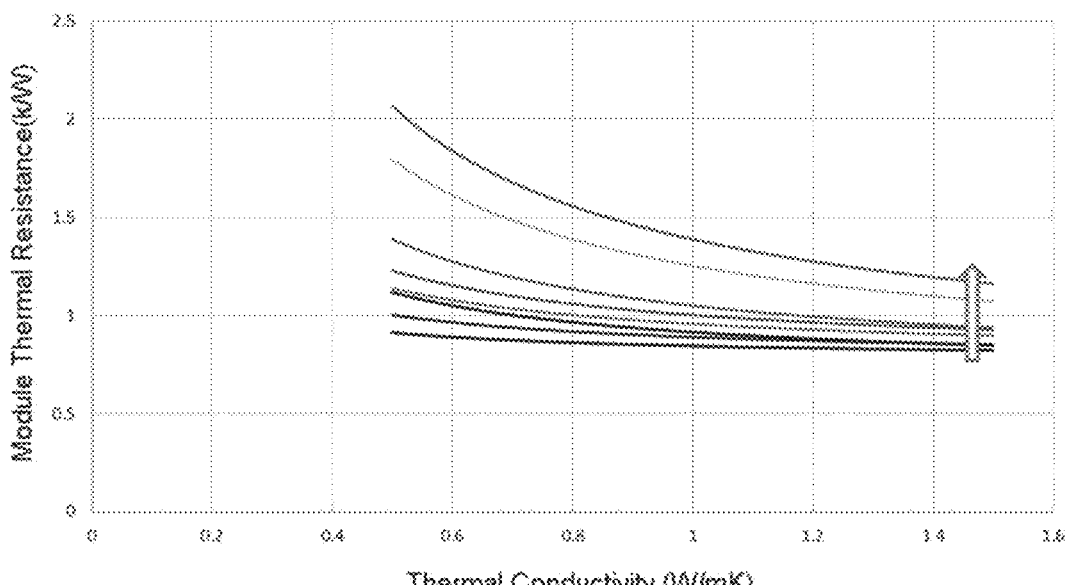

[FIG. 5]
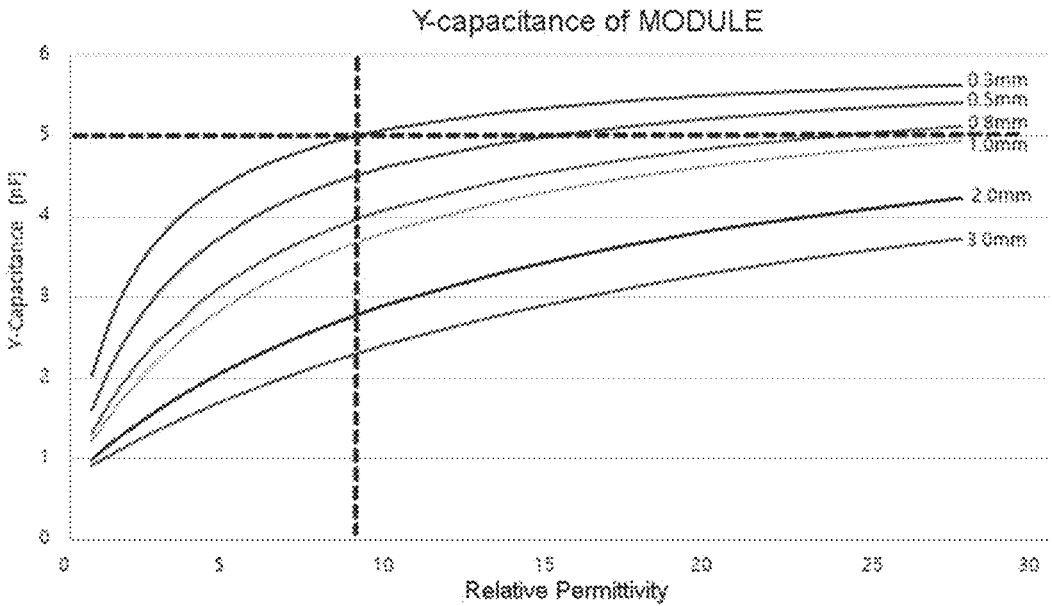

METHOD FOR DESIGNING BATTERY MODULE

CROSS-REFERENCE TO RELATED APPLICATIONS

This application claims priority under 35 U.S.C. § 119 to Korean Patent Application No. 10-2021-0068254, filed on May 27, 2021, in the Korean Intellectual Property Office, the disclosure of which is incorporated herein by reference in its entirety.

TECHNICAL FIELD

The following disclosure relates to a method for designing a battery module, and more particularly, to a method for designing a battery module having improved reliability and safety in use.

BACKGROUND

Interest in electric vehicles or hybrid vehicles that may be driven by batteries without using fossil energy is increasing. Battery modules for vehicles basically not only require high capacity and long lifespan, but also have to prove their stability in various harsh environments such as physical collisions, immersion, and combustion.

When a battery is installed in a vehicle, a capacitance component (Y-capacitance, hereinafter, referred to as Y-cap) and a leakage resistance component exist between a chassis ground of a vehicle and a ± terminal of a battery module, that is, between a module voltage of the battery module and the chassis ground. The leakage resistance component is determined by the insulation between the battery and the chassis ground, and may be easily controlled. However, the Y-cap, which is a capacitive coupling between the battery module and the chassis ground, may cause static electricity and sparks to workers during manufacturing of vehicles or drivers who are charging vehicles, thereby causing fatal electric shock damage, and cause noise in signals inside the vehicle, thereby causing malfunction. However, the Y-cap is affected by a wide variety of factors, and therefore, is not easily controlled. Research on thermal control of a battery module (Chinese Patent No. 109449347) is mainly conducted, but research for controlling the Y-cap to the desired level or less is insufficient.

RELATED ART DOCUMENT

Patent Document

Chinese Patent No. 109449347

SUMMARY

An embodiment of the present invention is directed to providing a method for designing a battery module capable of controlling a Y-Cap to a target value or less.

Another embodiment of the present invention is directed to providing a method for designing a battery module capable of securing stable heat dissipation characteristics in various module structures while controlling a Y-Cap to a target value or less.

Still another embodiment of the present invention is directed to providing a battery module having a Y-Cap controlled to a target value or less.

Yet another embodiment of the present invention is directed to providing a battery module having a controlled Y-Cap and having stable heat dissipation characteristics.

According to an aspect of the present invention, a method is provided for designing a battery module including a cell assembly in which a plurality of battery cells are stacked and a module case having an internal space in which the cell assembly is accommodated. The method includes: a) setting a lowermost portion of the module case with respect to a direction of gravity as a design side, and setting a region between the design side and the cell assembly as a design space; and b) obtaining a relative permittivity (also known as dielectric constant) $\varepsilon_r$ the design space satisfying Equation 1 by assuming that a shape of the design space is a form of a film having an area of $A_0$ and a thickness of $T_0$.

$$\varepsilon_r \varepsilon_0 A_0 / T_0 \le PCy \qquad \text{[Equation 1]}$$

(In Equation 1, Cy, which is a design value, is a Y-capacitance value of the battery module, P is a real number less than 1, and $\varepsilon_0$ is a permittivity of vacuum)

The P may be 0.5 to 0.95.

The relative permittivity $\varepsilon_r$ in an alternating current of 1 kHz to 1 MHz may be obtained, which satisfies Equation 1 in step b).

A stacking direction of the battery cells may be an in-plane direction of the design side, and in step a), the lowermost portion of the module case may be set as a cooling side at the same time as the design side.

The method may further include: after step a) and before step b), i) obtaining a first thermal conductivity that satisfies the following Equation 2 based on a thermal conductivity of the design space and a thermal resistance of the battery module according to a contact area between the design space and the cell assembly by assuming that the shape of the design space is a form of a film having a certain thickness $T_1$ and a certain area $A_0$.

$$Rth(0.33) \le 1.3\ Rth(1) \qquad \text{[Equation 2]}$$

(In Equation 2, Rth(0.33) is the thermal resistance of the battery module when the contact area is 0.33 $A_0$, and Rth(1) is the thermal resistance of the battery module when the contact area is 1 $A_0$)

The method may further include: after step i), ii) obtaining a Thickness $T_c$ of a film that satisfies the following Equation 3 based on the thermal resistance of the battery module according to a value of the first thermal conductivity and a film thickness $T_2$ by assuming that the shape of the design space is a form of a film having a certain area $A_0$.

$$Rth(t) \le Rth(Lim) \qquad \text{[Equation 3]}$$

(In Equation 3, Rth(t) is the thermal resistance of the battery module according to the film thickness, and Rth (Lim), which is a design value, is the thermal resistance of the battery module)

The battery cell may be a pouch-type battery cell.

In another general aspect, a battery module may include a cell assembly in which a plurality of battery cells are stacked and a module case having an internal space in which the cell assembly is accommodated, in which an intermediate layer having a thermal conductivity and insulation performance may be located between a lowermost portion of the module case with respect to a direction of gravity and the cell assembly, and a relative permittivity of the intermediate layer may be 9 or less based on an alternating current of 1 kHz to 1 MHz and 1 to 2 V.

The lowermost surface which is an inner surface of the lowermost portion may be a cooling surface, and a stacking direction of the battery cells may be an in-plane direction of the lowermost surface.

The thermal conductivity of the intermediate layer may be 0.5 W/mK or more.

The thermal conductivity of the intermediate layer may be 1 W/mK to 3 W/mK.

A thickness of the intermediate layer may be 0.3 to 3 mm.

A thickness of the intermediate layer may be 0.3 mm to 1 mm.

The intermediate layer may have a single-layer or multi-layer structure.

The intermediate layer may further satisfy one or more of the following physical properties.

a) Breakdown voltage≥5 kV/mm
b) Shear strength≥5 MPa
c) Bonding force with lowermost surface≥1000 fg/10 mm
d) Volume resistivity≥$10^{11}$ Ω·cm
e) Hardness≤Shore D 75

The battery cell may be a pouch-type battery cell.

BRIEF DESCRIPTION OF DRAWINGS

FIG. 1 is a cross-sectional view of a battery module illustrating a design space according to a design method of the present invention.

FIG. 2 is an example illustrating a process of obtaining a thermal conductivity of the design space according to the design method of the present invention.

FIG. 3 is a diagram illustrating thermal distribution of a cell assembly of a plurality of battery cell in the design method of the present invention.

FIG. 4 is an example illustrating a process of obtaining a thickness of the design space according to the design method of the present invention.

FIG. 5 is a diagram illustrating the Y-cap of the battery module according to relative permittivity (dielectric constant) and thickness of the design space according to the design method of the present invention.

DETAILED DESCRIPTION OF EMBODIMENTS

Hereinafter, a method for designing a battery module according to the present invention will be described in detail with reference to the accompanying drawings. The drawings are provided by way of example so that the various aspects and concepts of the present invention are adequately described to those with ordinary skill in the art of the present invention. Therefore, the present invention is not limited to the accompanying drawings and may be readily modified in many different embodiments without departing from the scope of the invention. In addition, the accompanying drawings are simplified schematics and have certain features exaggerated in order to more clearly present the present invention. Technical terms and scientific terms used in the present specification have the general meaning understood by those skilled in the art to which the present invention pertains unless otherwise defined, and a description for the known function and configuration unnecessarily obscuring the gist of the present invention will be omitted in the following description and the accompanying drawings.

In this specification and the appended claims, terms such as first, second, etc., are used for the purpose of distinguishing one component from another, not in a limiting sense.

In this specification and the appended claims, the terms "include" or "have" have the same meaning as the term "comprise" and mean that the listed features or elements are present and also other features or elements not listed may be present.

In this specification and the appended claims, a case in which a part of a film (layer), a region, a component, etc., is above or on another part includes not only a case in which the part is directly on another part in contact with another part, but also a case in which another film (layer), another region, another component, etc., is interposed therebetween.

The present applicant has confirmed that, in a battery module in which a plurality of battery cells are accommodated in an internal space of a module case, as a result of extracting dozens of factors affecting a Y-cap, changing these factors, and tracking the change in the Y-cap of the battery module by classifying the battery module into elements of a first group related to a size, shape, and structure of the overall module, such as various module sizes, various cell sizes, and various module configurations, elements of a second group related to detailed members constituting the module, such as a battery cell, a coating layer, an insulating layer, adhesive layers, a heat dissipation layer, a fixing pad, an air gap, a bus bar, and a protective cover, elements of a third group related to physical properties (physical properties according to materials for each element of the second group element, such as permittivity, thickness, compressibility, thermal conductivity, etc.) of each element of the second group, and elements of a fourth group related to the physical properties that change according to each element of the second group and/or according to the process between the elements of the second group, such as a change in a contact area between the detailed members, a shrinkage rate, and an expansion rate during the process performed until the finished module product is obtained, in a realistic module structure that may be implemented as a commercial battery module, when the module has a lower cooling structure, an LWR region which is an region between a lowermost portion of the battery module with respect to a direction of gravity and the battery cell located, has the greatest influence on the Y-cap of the battery module and a ratio of capacitance in the LWR area in the Y-cap of the battery module ranges from a minimum of 65% to a maximum of 95%.

Based on these findings, as a result of obtaining the capacitance of the LWR area so that the Y-cap of the battery module satisfies a design value, and measuring the Y-cap in the real battery module in which a member having the obtained capacitance value is provided in the LWR region, it was confirmed that the Y-cap of the module satisfies a design value as predicted to complete the present invention. In this case, it goes without saying that the design value of the Y-cap (Cy in Equation 1 to be described later) means the maximum Y-capacitance value allowable by the design, and it is interpreted as satisfying the design value when the Y-cap of the battery module is Cy or less.

The method for designing a battery module according to the present invention based on the above findings is a method for designing a battery module including a cell assembly in which a plurality of battery cells are stacked and a module case having an internal space in which the cell assembly is accommodated, in which the method includes: a) setting a lowermost portion of the module case with respect to a direction of gravity as a design side, and setting a region between the design side and the cell assembly as a design space; and b) obtaining a relative permittivity $\varepsilon_r$ of the design space satisfying Equation 1 by assuming that a shape of the design space is a form of a film having an area of $A_0$ and a thickness of $T_0$.

$$\varepsilon_r \varepsilon_0 A_0 / T_0 \leq PCy \qquad \text{[Equation 1]}$$

In Equation 1, Cy, which is a design value, is a Y-capacitance value of the battery module, P is a real number less than 1, and $\varepsilon_0$ is a permittivity of vacuum. Cy may be a value designed in consideration of a size or use of the battery module, and in one embodiment, Cy may be at a level of 1 to 30 nF, specifically, at a level of 1 to 10 nF, and according to specific examples, Cy may be 30 nF, 25 nF, 20 nF, 15 nF, 10 nF, 5 nF, 4 nF, 3 nF, 2 nF or 1 nF. In order to stably control the Y-capacitance to be at a value equal to the design value or less regardless of a specific dimension of the battery module to be designed, Cy in Equation 1 may be transformed into a Y-capacitance value per area of the lowermost portion of the module case of the battery module (area of the design side). This is because the area $A_0$ is substantially equal to the area of the lowermost portion of the module case of the battery module. Transforming Equation 1 into a Y-capacitance value per area $Cy^A$ may correspond to $Cy/A_0$, and Equation 1 may be expressed by $\varepsilon_r \varepsilon_0 / T_0 \leq PCy^A$. For example, in the case of a battery module for an electric vehicle or a hybrid vehicle, the Y-capacitance value per area $Cy^A$ may be at a level of 25 to 50 nF/m², preferably 25 to 40 nF/m².

FIG. 1 is a diagram illustrating a cross-sectional view of a battery module 100, and a module case 20 including a cell assembly in which a plurality of battery cells 10 are stacked and a plurality of battery cells 10 are accommodated. The cell assembly refers plurality of battery cells 10 arranged side by side to face each other in at least one direction.

FIG. 1 is a cross-sectional view of the battery module 100 illustrating a design space 30 defined as a region between a design side 21b, which is an inner surface of the lowermost portion 20b of the module case 20 in a direction of gravity, and the cell assembly including the plurality of the battery cells 10. FIG. 1 also shows an enlarged view of a region R of the battery module 100 defined by a dotted line circle In the example of FIG. 1 a stacking direction (shown by an arrow) of the battery cells 10 is parallel to an in-plane direction of the design side (inner surface of the lowermost portion) 21b. As illustrated in FIG. 1, the design space 30 is a space between an inner surface 21b of the design side 21b and the battery cell 10. In this case, as shown in the enlarged view, when the battery cell 10 is partially deformable, such as a pouch-type battery cell, a distance between the battery cell 10 and the inner surface 21b may not be constant due to a surface bending of the battery cell. In this case, a film thickness in the design space 30 of the form of the film may be defined as a minimum distance $T_0$ between the inner surface 21b of the lowermost portion 20b of the module case 20 and the battery cell 10.

As described above, a contribution rate of the design space (LWR region) to the Y-cap of the battery module ranges from a minimum of 65% to a maximum of 95%. Accordingly, by controlling the capacitance of the design space to a level of 65% to 95% or less of Cy, which is the Y-cap of the battery module, the battery module may have the Y-cap that is substantially the design value or less.

In Equation 1, a P value means a degree to which the design space contributes to the Y-cap of the battery module. By controlling the P value to be smaller, the Y-cap is controlled to be the design value or less, a Y-cap margin is secured, electrical stability and safety of use may be further improved, and furthermore, the degree of freedom in design of the battery module area other than the design space may be increased.

As the contribution rate of the design space to the Y-cap of the battery module ranges from a minimum of 65% to a maximum of 95%, P may be 0.65 to 0.95. However, in terms of further increasing the degree of freedom in design of the battery module outside of the design space and ensuring electrical stability and safety of use, P may be 0.5 to 0.95, 0.5 to 0.90, 0.5 to 0.85, 0.5 to 0.80, or 0.5 to 0.75.

In Equation 1, $\varepsilon_r \varepsilon_0 A_0 / T_0$ corresponds to the capacitance of the design space (LWR region). In this case, as described above based on FIG. 1, $T_0$ may be the minimum distance between the inner surface of the design side and the battery cell. For example, when the battery cell is a pouch-type battery and is fixed to the lowermost portion of the module case by an adhesive layer, the distance between the battery cell and the lowermost portion (inner surface of the lowermost portion) may vary or become non-uniform. In addition, even when a volume of the pouch-type battery cell changes, the distance between the battery cell and the lowermost portion (inner surface) may vary. In this case, since the capacitance increases as the distance decreases, it is advantageous to obtain a relative permittivity of the design space by setting the minimum distance among the non-uniform distances to the thickness of the design area.

In this case, as the capacitance of the design space increases as the relative permittivity increases, it is reasonable to interpret the relative permittivity obtained through Equation 1 as the maximum usable relative permittivity. When obtaining using Equation 1, as the insulation of the battery module, which is an essential condition for commercial battery modules, needs to be secured, a lower limit of the relative dielectric constant $\varepsilon_r$ of the design space considering a permittivity of non-conductive solid materials may be substantially 1.5 or more, and more substantially 2 or more. Accordingly, a specific numerical range of the relative permittivity having an upper limit and a substantial lower limit range of the relative permittivity based on Equation 1 can be derived.

As described above, by obtaining the permittivity of the design space so that the Y-capacitance in which the Y-capacitance value per area $Cy^A$ satisfies 25 to 50 nF/m², specifically 25 to 40 nF/m² in consideration of the dimension of the battery module satisfies Equation 1, it is possible to prevent static electricity, sparks, electric shock accidents, etc., occurring to workers or users during charging of the battery module, and prevent a disturbance between battery management system (EMS) signals, thereby improving reliability and safety.

The relative permittivity $\varepsilon_r$ of Equation 1 may be a relative permittivity under an alternating current condition of 1 kHz to 1 MHz. Specifically, the relative permittivity $\varepsilon_r$ of Equation 1 may be a relative permittivity in alternating current conditions having a frequency of 1 kHz to 1 MHz and a voltage of 1 to 2 V. The relative permittivity $\varepsilon_r$ (dielectric constant) is obtained by Equation 1 under these alternating conditions, so that it is possible to effectively suppress the occurrence of static electricity, sparks, or the like in various situations in which the battery module is undergone, such as a charging process of the battery module, a discharging process (providing power to loads), and a charge equalization process by the battery management system (BMS). Hereinafter, unless otherwise specifically limited, the relative permittivity (dielectric constant), capacitance (including Y-cap), etc., may be based on an alternating current condition having a frequency of 1 kHz to 1 MHz and a voltage of 1 to 2 V, more specifically, an alternating current of 1 kHz and 1 V.

As is known, a battery cell may have a structure in which an electrode structure of a cathode-separator-anode is immersed (wet) in an electrolyte and sealed in an encapsulant or a can. Thus, heat transfer is difficult to easily occur by the plurality of electrode structures in the stacking direction of the battery cells. Therefore, when the stacking direction of the battery cells is the in-plane direction of the lowermost surface of the module case (inner surface of the lowermost portion of the module case with respect to the direction of gravity), it is effective that the heat dissipation of the battery cells is performed in a direction perpendicular to the stacking direction.

In the method for designing a battery module according to an embodiment, the stacking direction of the battery cells may be the in-plane direction of the design side. In this case, the lowermost portion of the module case in step a) may be set as a cooling side at the same time as the design side. In this case, the lowermost portion of the module case may correspond to the cooling plate.

When the lowermost portion is set as the cooling side, the design of the physical properties or structure of the design space (LWR region) capable of securing stable heat dissipation characteristics of the battery module in various module structures while satisfying the Y-cap of the design value may be further performed.

In detail, the method for designing a battery module according to one embodiment may further include, after step a) in which the lowermost portion of the module case is set as the cooling side at the same time as the design side and before step b), i) obtaining a first thermal conductivity that satisfies the following Equation 2 based on the thermal conductivity of the design space and the thermal resistance of the battery module according to a contact area between the design space and the cell assembly by assuming that the shape of the design space is a form of a film having a certain thickness $T_1$ and a certain area $A_0$.

$$Rth(0.33) \leq 1.3\,Rth(1) \qquad \text{[Equation 2]}$$

In Equation 2, Rth(0.33) is the thermal resistance of the battery module when the contact area is $0.33\,A_0$, and Rth(1) is the thermal resistance of the battery module when the contact area is $1\,A_0$.

When heat dissipation of the battery cell is made through the lower portion of the module (lower cooling structure), the factors (cooling factor) that have a major influence on the thermal resistance of the battery module may include a path (length) through which heat is conducted, an area through which heat is conducted, and thermal conductivity. Among them, the factors (cooling factor) that change the most in the specific module structure (design) or process in commercially feasible battery modules extracted as the elements of groups 1 to 4 is the area where heat is conducted, and it is confirmed that the area through which heat is conducted may be reduced to at least $0.33\,A_0$ in consideration of all the elements of groups 1 to 4 in commercially feasible battery modules.

Accordingly, in the case of preventing a change in cooling characteristics due to the change in the contact area that enables heat conduction rather than any other factor (cooling factor), it is possible to secure stable and excellent heat dissipation characteristics of the module regardless of the structure (design) of the specific module or the module manufacturing process.

Equation 2 obtains the thermal conductivity (first thermal conductivity) in the design space in which the thermal resistance Rth(0.33) of the battery module in the thermal conduction area of $0.33\,A_0$ satisfies 1.3 times or less, preferably 1.25 times or less, more preferably 1.20 times or less, even more preferably 1.15 times or less, and most preferably 1.1 times or less of the thermal resistance Rth(1) of the battery module, based on the thermal conductivity of the design space and the thermal resistance of the battery module according to the contact area between the design space and the cell assembly of the battery cells.

In this case, the higher the thermal conductivity, the better the heat dissipation characteristics, and, thus, it is reasonable to interpret the thermal conductivity obtained through Equation 2 as the minimum usable thermal conductivity. Considering the thermal conductivity of materials having nonconductive and excellent thermal conductivity, the thermal conductivity of curable materials, and the thermal conductivity of composites thereof so as not to damage the insulation of the battery module, which is an essential condition for commercial battery modules, substantially, the upper limit of thermal conductivity of the design space may be 10 W/(m·K) or less, substantially 5 W/(m·K) or less, and more substantially 3 W/(m·K) or less. Accordingly, a specific numerical range of thermal conductivity having a range of a lower limit and a substantial upper limit of thermal conductivity based on Equation 2 may be derived.

Since the design space has the obtained first thermal conductivity, the heat dissipation characteristics of the module may be stably secured regardless of the specific structure (design) of the specific module, the specific manufacturing process of the module, and the contact area between the design space and the cell assembly.

As described above, the method for designing a battery module according to one embodiment may further include, after establishing the conditions in which the heat dissipation characteristics may be secured substantially regardless of the specific structure of the module or the manufacturing process, and the contact area between the design space and the cell assembly through step i), step ii) of obtaining the thickness of the design space to satisfy the minimum cooling performance required for smooth cooling of the battery module.

That is, the method for designing a battery module according to an embodiment may further include, after step i), obtaining a thickness $T_c$ of a film that satisfies the following Equation 3 based on the thermal resistance of the battery module according to a value of the first thermal conductivity and a thickness $T_2$ of the film by assuming that the shape of the design space is a form of a film having a certain area $A_0$.

$$Rth(t) \leq Rth(Lim) \qquad \text{[Equation 3]}$$

In Equation 3, Rth(t) is the thermal resistance of the battery module according to the film thickness, and Rth (Lim), which is a design value, is the required thermal resistance of the battery module. Specifically, Rth(Lim) is the thermal resistance value of the battery module related to the output of the battery module in which the cooling performance may be secured, and is a value known, required, and commonly used according to the specific use of the battery module. For example, in the case of a battery module for an electric vehicle, Rth(Lim) may be 2 K/W. In this case, as the cooling performance is improved as the thermal resistance is lower, it goes without saying that the design value Rth(Lim) means the required upper limit of the thermal resistance of the module.

In this case, since the thermal resistance of the module decreases as the thickness of the design space decreases, it is reasonable to interpret the thickness $T_c$ obtained through Equation 3 as the maximum thickness that may satisfy Rth(Lim). In addition, when obtaining the film thickness satisfying Equation 3 based on the value of the first thermal conductivity and the thermal resistance of the battery module according to the film thickness, the contact area may be set to 1 $A_0$ or 0.33 $A_0$. This is because, through Equation 2, the thermal conductivity of the design space in which the change in cooling characteristics is prevented due to the change in the contact area that enables the heat conduction is obtained. However, for the design stability, when obtaining the film thickness satisfying Equation 3, it is preferable to obtain the thickness $T_c$ of the film satisfying Equation 3, based on the value of the first thermal conductivity and the thermal resistance of the battery module according to the film thickness under the condition that the contact area is 0.33 $A_0$.

The commercial battery module, in particular, the vehicle battery module, should be in an insulated state for electrical stability, and the battery cells should be physically attached and fixed for mechanical stability. Accordingly, the thickness of the design space in the form of the film should be at least a thickness that may stably attach and fix the battery cells to the lowermost surface, and be more than a thickness that may secure stable insulating properties. In consideration of this, the lower limit of the thickness of the design space may be substantially 0.3 mm or more, preferably 0.5 mm or more.

As described above, after the thermal conductivity of the design space in which the heat dissipation characteristics may be secured regardless of the contact area is obtained through step i), the specific numerical range of the thickness that may satisfy the cooling performance required through step ii), that is, a specific numerical range of the thickness of the design space having the upper limit $T_c$ of the film thickness based on Equation 3 and the substantial lower limit range may be derived.

Returning to Equation 1 again, $A_0$ in Equation 1 may correspond to the area of the lowermost surface (the area of the inner surface of the lowermost portion of the module case) in the module case. In Equation 1, $T_0$ may be divided into three cases.

First, when the size of the design space is already set according to the design of the battery module, $T_0$ may depend on the design value. In this case, when step i) is further performed, the thickness of the design space in the form of the film in step i) may also be $T_0$, and then, instead of step ii), following step iii) by assuming that the shape of the design space is a form of a film having a certain thickness $T_0$ and a certain area $A_0$, a step of obtaining a second thermal conductivity satisfying Equation 4 may be further performed.

$$Rth'(t) \leq Rth(Lim) \qquad \text{[Equation 4]}$$

In Equation 4, Rth'(t) is the thermal resistance of the battery module according to the thermal conductivity of the film, and Rth(Lim), which is the design value, is the required thermal resistance of the battery module.

A new lower limit of the thermal conductivity may be obtained by Equation 4, and through this, a new (narrower) range of thermal conductivity that satisfies the cooling characteristics required for each battery module output and exhibits stable cooling characteristics without being substantially affected by the specific structure of the battery module may be obtained.

Second, when $T_0$ is not defined as a design value and heat dissipation characteristics are not considered according to an embodiment, $T_0$ in Equation 1 may be defined as 0.3 mm to 1 W, specifically 0.3 mm to 0.5 W, based on a thickness W (see FIG. 1) of one battery cell in one battery cell of the cell assembly. The $T_0$ is a thickness at which robust insulation may be secured when various known insulators such as an insulating layer, a cooling pad, a heat dissipation adhesive, a coating layer, and/or an adhesive layer are introduced between the cell assembly of the cells and the bottom of the module case in the battery module whose lower portion is cooled, and is a thickness that may stably secure a 3 kV withstand voltage characteristic, which is an insulation required for batteries for electric vehicles or hybrid vehicles. In this case, the relative permittivity may be obtained to satisfy Equation 1 in the entire range of $T_0$.

Third, when $T_0$ is not defined as a design value and is obtained to satisfy both heat dissipation characteristics and cooling characteristics according to an embodiment, after step a) and before step b), step i) is performed, but the thickness $T_1$ of the design space in the form of the film is subjected to step i) to a certain thickness that satisfies 0.3 mm to 1 W, the upper limit $T_c$ of the film thickness obtained based on Equation 3, specifically, the film thickness obtained based on Equation 3, and the specific numerical range of the design space thickness having a substantial lower limit range is obtained by step ii), and then, in step b), the relative permittivity of the design space may be obtained using $T_0$ that satisfies the film thickness range obtained by step ii). In this case, the relative permittivity may be obtained to satisfy Equation 1 in the entire obtained range of $T_0$.

In the method for designing a battery module according to the present invention, the battery cell may be a pouch-type battery or a prismatic battery. In a prismatic battery, the electrode assembly of cathode-separator-anode and electrolyte are sealed by a prismatic metal can container, and in the pouch-type battery, the electrode assembly is sealed by an encapsulant. In this case, the encapsulant (pouch) may have a multi-layer film structure in which a metal film such as an aluminum film is interposed between an outer film and an inner film, but is not limited thereto. When the cooling performance of steps i) and ii) or i) and iii) is also considered, the present invention is more effective in the pouch-type battery cell.

The above-described method for designing a battery module may be performed using a conventional tool for simulating thermal and electrical characteristics of an energy storage system. Accordingly, the present invention includes a computer-readable recording medium storing a computer program for performing the above-described method for designing a battery module. The design method of the present invention may also be implemented in the form of a recording medium including instructions executable by a computer, such as a program module to be executed by a computer. A computer-readable medium may be any available medium that may be accessed by the computer, and includes both volatile and nonvolatile media and separable and nonseparable media. Also, the computer-readable media may include computer storage media. The computer storage media includes both volatile and nonvolatile, separable, and nonseparable media implemented in any method or technology for storage of information such as computer readable instructions, data structures, program modules, or other data.

Hereinafter, taking, as an example, a battery module that is based on a lower cooling structure in which a cooling plate in which a refrigerant flow path is formed by a partition wall is located at a lower portion of the module case, a pouch-type battery cell and a metal module case, and in which a pad, an insulating sheet, and an air gap are located at an upper portion of the cell assembly of the battery cells between the module case and the cell assembly of the battery cells, pads are located on both sides thereof, a bus bar, an air gap, a first resin member, an air gap, a second resin member, and an air gap are located in the front and rear thereof, and a design space is located at the lower portion thereof, physical properties of the design space are obtained by the design method performed according to an embodiment, and a comparison result is provided by manufacturing a seal module so that the design space satisfies the physical properties.

FIG. 2 is a diagram illustrating a process of obtaining the thermal resistance of the battery module according to the contact area and the thermal conductivity of step i) in the battery design method according to an embodiment that satisfies both the cooling performance and Y-cap characteristics. FIG. 3 illustrates an example of heat distribution in the cell assembly of the battery cells under one condition when the thermal resistance of the battery module according to the contact area and the thermal conductivity is obtained. In this case, 0.1 W is set as the thickness $T_2$ of the design space in the form of the film. In FIG. 2, the upper limit denotes a result when the contact area is 1 $A_0$, and the lower limit denotes a result when the contact area is 0.33 $A_0$. As in the example illustrated in FIG. 2, since the thermal conductivity of the design space is designed to satisfy Equation 2, the stable cooling performance may be secured substantially regardless of the contact area. The thermal conductivity (lower limit) obtained by Equation 2 is 0.5 W/m·K), and the thermal conductivity (lower limit) obtained under the condition that the thermal resistance Rth(0.33) is 1.1 times or less of the thermal resistance Rth(1) is 1 W/(m·K).

FIG. 4 is a diagram illustrating the thermal resistance of the battery module according to the thickness of the design space in the thermal conductivity range of 0.5 W/(m·K) to the substantial and realistic upper limit of 3 W/(m·K). The thermal resistance of the battery module in FIG. 4 is a result of having a contact area of 0.33 $A_0$, and as the thermal conductivity increases and the thermal resistance of the module decreases, only the results of 0.5 to 1.5 W/(m·K) are shown. In FIG. 4, the direction in which the film thickness of the design space increases is illustrated in the direction of the arrow.

As the result illustrated in FIG. 4, when the thickness of the design space changes (minimum thickness=0.3 mm) from the thickness of 0.1 W specified temporarily in step i), as the thickness of the design space increases and the thermal conductivity of the design space decreases, it can be seen that the module thermal resistance value increases. When Rth(Lim) is 2 K/W, in order to satisfy the module thermal resistance condition of 2 K/W or less at the lower limit of the thermal conductivity of 0.5 W/(m·K), it can be seen that the thickness should be less than 3 mm. In addition, when Rth(Lim) is 1 K/W, the thickness of the design space that satisfies the module thermal resistance condition of 1 K/W or less at 0.5 W/(m·K) which is the lower limit of the thermal conductivity is 0.3 mm, and has reached the limit thickness at which insulation is substantially secured. On the other hand, based on 1 W/(m·K) which is the thermal conductivity (lower limit) obtained by the condition that the thermal resistance Rth(0.33) is 1.1 times or less of the thermal resistance Rth(1), the module thermal resistance condition of 2 K/W or less is satisfied in all the changed thicknesses (0.3 mm to 3.5 mm). In addition, based on 1 W/(m·K) which is the thermal conductivity (lower limit) obtained by the condition that the thermal resistance Rth (0.33) is 1.1 times or less of the thermal resistance Rth(1), when Rth(Lim)=1 K/W, in the case where the thickness of the design space is less than 1 mm, the module thermal resistance satisfies less than 1 K/W. As illustrated in FIG. 4, based on the specific thermal conductivity (lower limit) obtained in step i), a thickness (upper limit value) that may satisfy Rth(Lim) of 1 to 2 K/W through step ii) may be obtained. When the thickness is 3 mm or less, substantially 0.3 to 3 mm in the case where the thermal conductivity obtained under the condition of Rth(0.33)≤1.3 Rth (1) is 0.5 W/(m·K), the module thermal resistance of 2 K/W (Rth (Lim)) or less may be satisfied, and when the thickness is 1 mm or less, substantially 0.3 to 1 mm in the case where the thermal conductivity obtained under the condition of Rth (0.33)≤1.1 Rth(1) is 1 W/(m·K), the module thermal resistance of 1 K/W (Rth(Lim)) or less may be satisfied.

At a P of 0.5 to 0.95 and a $T_0$ range of 0.3 to 3 mm or a $T_0$ of 0.3 to 1 mm, as illustrated in FIG. 5, as the result of comparing the Y-cap of the battery module according to the relative permittivity of the design space and the thickness $T_0$ of the design space, as obtained through Equation 1, is can be seen that the Y-cap of the battery module satisfies 5 nF or less when the relative permittivity of the design space is 9 or less in the thickness change of 0.3 mm to 3 mm.

Based on these design results, the same module as the module structure used in the design is actually manufactured, but a heat dissipation adhesive layer is formed in the design space of the lowermost surface of the module, and narrow sides of a plurality of pouch-type battery cells are bound and fixed by the heat dissipation adhesive layer. In this case, the contact area between the heat dissipation adhesive layer and the pouch-type battery cell in the design space is 85% of the area of the lowermost surface. The thermal conductivity (based on ISO 22007-2) in the thickness direction of the heat dissipation adhesive layer located in the design space is 1.2 W/(m·K), the thickness of the heat dissipation adhesive layer is 1 mm, and the relative permittivity of the heat dissipation adhesive layer is 8.95 based on 1 kHz and 1 V, 6.98 based on 1 MHz and 1 V, 8.87 based on 1 kHz and 2 V, and 6.92 based on 1 MHz and 2 V. In this case, the relative permittivity of the heat dissipation adhesive layer is measured based on ASTM D-150, and the permittivity measurement sample dimensions are 0.9 cm in length, 3 cm in width, and 0.3 cm in thickness. After the heat-dissipating adhesive layer satisfying the sample dimensions is formed by being applied on a silicon wafer and cured at room temperature, Ag is vacuum-deposited to form an electrode, and an average value of the capacitance measured for 10 seconds is taken using a precision semiconductor parameter analyzer 4156A (Hewlett-Packard Co.) In addition, an insulation breakdown voltage (based on ASTM D-149) of the heat dissipation adhesive layer is 10 kV/mm, a surface resistivity (based on ASTM D-257) is $10^{12}$ Ω/sq., a volume resistivity (based on ASTM D-257) is $10^{11}$ Ω·cm, a shore D hardness of the heat dissipation adhesive layer (based on ASTM D2240) is 67, a shear strength (based on ASTM D1002) is 6.5 MPa, and a 180° peel strength of the heat dissipation adhesive layer (based on ASTM D903) was 1100 gf/cm. The thermal resistance of the module is measured by attaching a thermal interface material (1.3 W/m·K) to an upper surface of the cooling member having a flow path through which the cooling medium flows, seating the battery module and pressurizing and fixing the battery module using a clamp, and then electrically connecting the battery module to a charger/discharger, repeatedly performing charging and discharging (full charging/full discharging) hundreds of times to thousands of times, measuring a temperature $T_1$ of the battery cell and a temperature $T_2$ of the lower portion of the module (upper side of the thermal interface material) during the repeated charging and discharging, obtaining heat W generated in the battery cell(s) using an internal resistance of the battery cell and the applied current value, dividing a temperature difference between $T_1$ and $T_2$ by the heat to obtain Rth (Rth=$[T_1-T_2]$/heat, K/W), and taking its maximum value. The Y-cap of the battery module is measured under the applied frequency and voltage conditions of 1 kHz and 1 V after displacing an LCR meter connected to a noise filter and receiving power and the battery module on an insulated test stand and then connecting a (+) terminal of the battery module and the module case to the LCR meter. The thermal resistance of the manufactured battery module is 0.93 K/W, and the Y-cap of the battery module is 3.3 nF. Through this, it can be seen that, when the intermediate layer is designed according to the design method according to the embodiment, it is possible to manufacture a battery module satisfying the required cooling characteristics and the Y-cap characteristics of the design value. In addition, as a result of manufacturing the same battery module by changing the thickness of the heat dissipation adhesive layer and measuring the thermal resistance and the Y-cap of the battery module, it is confirmed that the heat dissipation adhesive having a thermal conductivity of 1.2 W/mK and a relative permittivity of 8.95 (1 kHz, 1 V) satisfies the module thermal resistance of 2 K/W or less and the Y-cap of 5 nF or less in the entire thickness range of 0.3 mm to 3 mm.

The present invention includes a battery module designed with the above-described method for designing a battery module.

The battery module according to the present invention is a battery module including a cell assembly in which a plurality of battery cells are stacked and a module case having an internal space in which the cell assembly is accommodated, and an intermediate layer is located between a lowermost portion of the module case with respect to a direction of gravity and the cell assembly, and the relative permittivity of the intermediate layer may be 9 or less, preferably 8.5 or less, more preferably 8 or less, more preferably 7.5 or less, even more preferably 7 or less, and may be substantially 1.5 or more, and more substantially 2 or more. In this case, the relative permittivity may be based on ASTM D-150, and may be a relative permittivity in an alternating current of 1 kHz to 1 MHz, specifically an alternating current of 1 kHz to 1 MHz and 1 to 2V.

In the battery module according to an embodiment, the lowermost surface which is inner surface of the lower most portion of the module case may be a cooling surface, and the stacking direction of the battery cells may be an in-plane direction of the lowermost surface. That is, the battery module according to an embodiment may have a lower cooling structure.

In the battery module according to an embodiment, the thermal conductivity of the intermediate layer may be 0.5 W/mK or more, 0.6 W/mK or more, 0.7 W/mK or more, 0.8 W/mK or more, 0.9 W/mK or more, 1 W/mK or more, 1.1 W/mK or more, 1.2 W/mK or more, 1.3 W/mK or more, 1.4 W/mK or More, or 1.5 W/mK or more, and substantially 10 W/(m·K) or less, 5 W/(m·K) or less, or 3 W/(m·K) or less.

In the battery module according to an embodiment, the thickness of the intermediate layer may be 0.3 to 3 mm or 0.3 to 1 mm.

In the battery module according to an embodiment, the intermediate layer may have a single-layer or multi-layer structure.

In the battery module according to an embodiment, the intermediate layer may further satisfy one or more of the following physical properties.

a) Breakdown voltage≥5 kV/mm
b) Shear strength≥5 MPa
c) Bonding force≥1000 fg/10 mm
d) Volume resistivity≥$10^{11}$ Ω·cm
e) Hardness≤Shore D 75

In the battery module according to an embodiment, the Y-cap of the module may be 30 nF or less, 25 nF or less, 20 nF or less, 15 nF or less, 10 nF or less, 5 nF or less, 4 nF or less, 3 nF or less, 2 nF or less, or 1 nF or less.

In the battery module according to an embodiment, the battery cell may be a pouch-type battery or a prismatic battery, preferably a pouch-type battery.

As the method for designing a battery module according to the present invention provides a design method in which a battery module satisfying a designed Y-cap may be implemented, it is possible to prevent static electricity, sparks, electric shock accidents, etc., occurring to workers or users, and prevent a disturbance between battery management system (BMS) signals, thereby improving reliability and safety.

Further, according to the method for designing a battery module according to an embodiment of the present invention, it is possible to implement the battery module that satisfies the designed Y-cap and has stable heat dissipation characteristics substantially independent of a specific structure even if the structure of the battery module is changed.

Hereinabove, although the present invention has been described by specific matters, exemplary embodiments, and the accompanying drawings, they have been provided only for assisting in the entire understanding of the present invention. Therefore, the present invention is not limited to the exemplary embodiments. Various modifications and changes may be made by those skilled in the art to which the present invention pertains from this description.

Therefore, the spirit of the present invention should not be limited to these exemplary embodiments, but the claims and all of modifications equal or equivalent to the claims are intended to fall within the scope and spirit of the present invention.

What is claimed is:

1. A method for designing a battery module including a cell assembly in which a plurality of battery cells are stacked and a module case having an internal space in which the cell assembly is accommodated, the method comprising:

step a) setting a lowermost portion of the module case with respect to a direction of gravity as a design side, and setting a region between the design side and the cell assembly as a design space;

step b) obtaining a relative permittivity $\varepsilon$ of the design space satisfying Equation 1

$$\varepsilon_r \varepsilon_0 A_0 / T_0 \leq PCy \qquad \text{(Equation 1)},$$

wherein the design space is formed of a film having an area of $A_0$ and a thickness of $T_0$, wherein the area of $A_0$ is substantially equal to the area of the lowermost portion of the module case of the battery module, wherein Cy is a Y-capacitance value of the battery module and has a value of 1 to 30 nF, P is a real number less than 1, and $\varepsilon_0$ is a permittivity of vacuum; and step c) providing the battery module including the design space having the relative permittivity $\varepsilon$ obtained in step b).

2. The method of claim 1, wherein the P is 0.5 to 0.95.

3. The method of claim 1, wherein the relative permittivity in an alternating current of 1 kHz to 1 MHz is obtained, which satisfies Equation 1, in the step b).

4. The method of claim 1, wherein a stacking direction of the battery cells is an in-plane direction of the design side, and in the step a), the lowermost portion of the module case is set as a cooling side at the same time as the design side.

5. The method of claim 4, further comprising:

after the step a) and before the step b), step i) obtaining a first thermal conductivity that satisfies the following Equation 2 based on a thermal conductivity of the design space and a thermal resistance of the battery module according to a contact area between the design space and the cell assembly, $$\text{Rth}(0.33) \leq 1.3 \ \text{Rth}(1) \qquad \text{[Equation 2]}$$

wherein in Equation 2, Rth(0.33) is the thermal resistance of the battery module when the contact area is 0.33 $A_0$, and Rth(1) is the thermal resistance of the battery module when the contact area is 1 $A_0$.

6. The method of claim 5, further comprising:

after the step i), step ii) obtaining a thickness $T_c$ of a film that satisfies the following Equation 3 based on the thermal resistance of the battery module according to a value of the first thermal conductivity and a film thickness, $$\text{Rth}(t) \leq \text{Rth}(\text{Lim}) \qquad \text{[Equation 3]}$$

wherein in Equation 3, Rth (t) is the thermal resistance of the battery module according to the film thickness, and Rth (Lim), which is a design value, is the thermal resistance of the battery module.

7. The method of claim 1, wherein the battery cell is a pouch-type battery cell.

8. The method of claim 1, wherein $T_0$ is 0.3 mm to W, wherein W is a thickness of one battery cell of the plurality of battery cells.

* * * * *